United States Patent
Kalipinski et al.

(10) Patent No.: US 7,509,764 B2
(45) Date of Patent: Mar. 31, 2009

(54) PLANT IDENTIFICATION MARKER AND METHOD

(76) Inventors: Eileen Marie Kalipinski, 7 Country La., Kingston, NH (US) 03827; Warren Hyland, 703 Fourmile Canyon Dr., Boulder, CO (US) 80302

( * ) Notice: Subject to any disclaimer, the term of this patent is extended or adjusted under 35 U.S.C. 154(b) by 0 days.

(21) Appl. No.: 11/787,042

(22) Filed: Apr. 13, 2007

(65) Prior Publication Data

US 2008/0010882 A1    Jan. 17, 2008

Related U.S. Application Data

(60) Provisional application No. 60/792,920, filed on Apr. 18, 2006.

(51) Int. Cl.
*G09F 23/00* (2006.01)
(52) U.S. Cl. .................. 40/645; 40/654.01; 40/611.09
(58) Field of Classification Search .................. 40/645, 40/649, 654.01, 607.05, 611.06, 611.09; 47/66.6
See application file for complete search history.

(56) References Cited

U.S. PATENT DOCUMENTS

| | | | |
|---|---|---|---|
| 833,663 A | 10/1906 | Bateman | |
| 901,137 A * | 10/1908 | Willis | 40/645 |
| 1,679,061 A * | 7/1928 | Smedley | 40/645 |
| 1,966,922 A | 7/1934 | Coleman | |
| 2,012,990 A | 9/1935 | Choate | |
| 2,181,977 A | 12/1939 | Magovern | |
| 2,207,180 A * | 7/1940 | Smith et al. | 40/645 |
| 2,294,567 A | 9/1942 | Mooney | |
| 2,333,302 A | 11/1943 | Enk | |
| D170,936 S | 11/1953 | Pegram | |
| D186,779 S | 12/1959 | Borin | |
| 3,775,882 A * | 12/1973 | Wheeler | 40/645 |
| 4,027,410 A * | 6/1977 | Wheeler | 40/645 |
| 4,079,530 A * | 3/1978 | Atherton et al. | 40/645 |
| 4,534,125 A * | 8/1985 | Buck | 40/645 |
| 5,369,902 A * | 12/1994 | Minster | 40/645 |
| 6,327,804 B1 * | 12/2001 | Shaw | 40/645 |
| 6,553,701 B1 * | 4/2003 | Neisen et al. | 40/645 |
| 6,564,490 B1 * | 5/2003 | Avila | 40/745 |
| 6,729,059 B1 | 5/2004 | Overdevest | |
| 2005/0044764 A1 * | 3/2005 | Decker | 40/645 |

* cited by examiner

*Primary Examiner*—William L. Miller
(74) *Attorney, Agent, or Firm*—David A. Greenlee

(57) ABSTRACT

A plant identification marker has a leaf-shaped body with a pointed stem depending from the body for insertion in the ground. The lower portion of the leaf is covered by a mating front cover that is ultrasonic welded to it on the sides only, thereby creating a confining pocket having upper open slot, and a lower open slot enabling water drainage from the pocket. The top and bottom of a conventional thin plastic plant marker tag are cut off the middle portion. The upper slot in the plant identification marker is wide enough to receive a middle portion of the plant I.D. tag or a portion of a seed packet for partial storage in the pocket, while allowing a small upper portion bearing plant identification to be displayed.

1 Claim, 11 Drawing Sheets

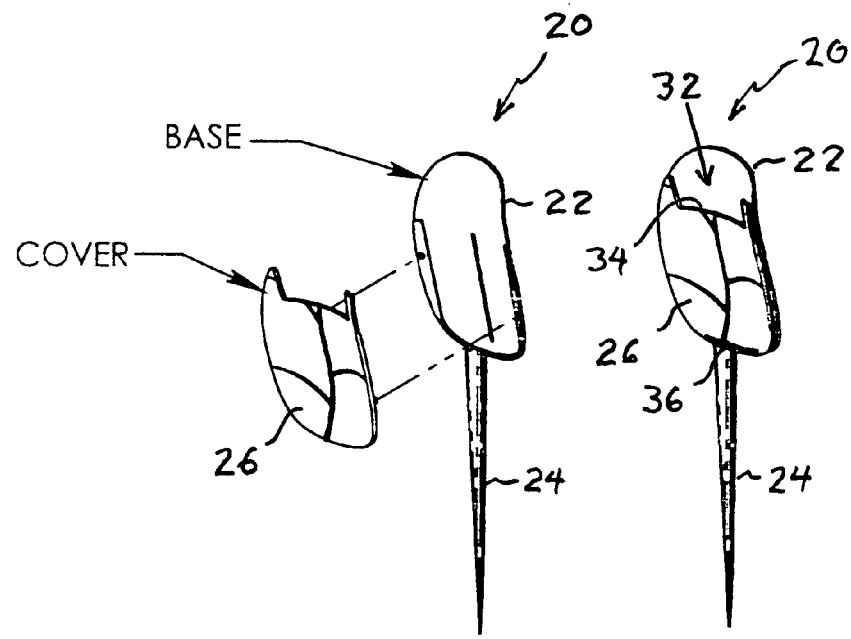
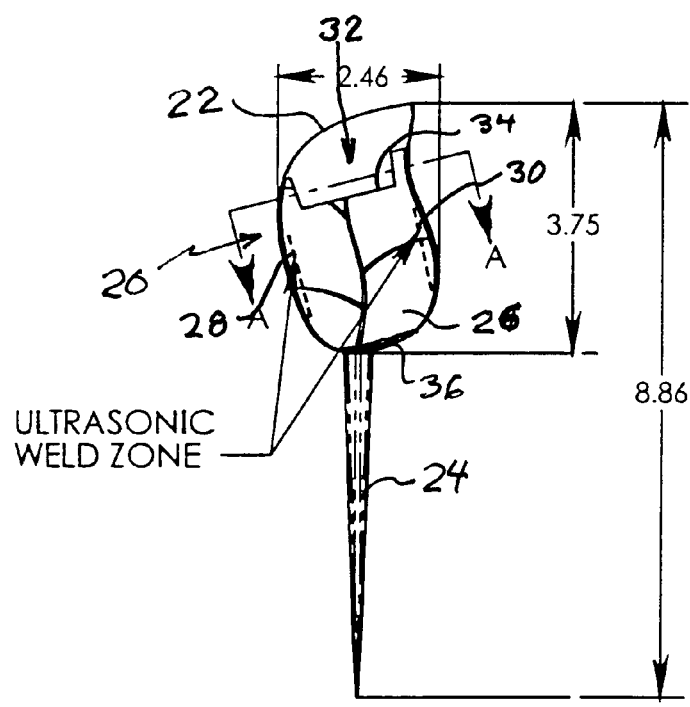
Fig. 1   Fig. 2
Fig. 3

SECTION A-A
SCALE 1 : 1

PLANT IDENTIFICATION MARKER AND METHOD

RELATED APPLICATIONS

This application claims priority of U.S. Provisional Patent Application No. 60/792,920, filed Apr. 18, 2006.

FIELD OF THE INVENTION

This invention relates generally to identification holders, and more particularly to an identification holder for identifying flowers, vegetables and other varieties of plants.

DESCRIPTION OF THE PRIOR ART

Use of markers to identify rows of garden crops and flower beds is well known. An early method involved simply inserting an empty seed packet into the cleft end of a stick, then inserting the other end of the stick into the ground proximate the row of seeds. This method is unsatisfactory in that the packets, when exposed to weather, become soiled, wrinkled and torn, reducing or destroying readability.

The use of wooden stakes bearing crop-identifying inscriptions as garden markers is an improvement over the paper seed packet on a stick. An example of such a stake is disclosed in U.S. Pat. No. 2,294,567—Mooney, granted Sep. 1, 1942. When exposed to the weather, inscriptions on the wooden stakes tend to become blurred and illegible. One attempt to solve this problem is the use of a transparent cellophane casing shown in U.S. Pat. No. 2,181,977—Magovern on Dec. 5, 1939.

Transparent materials have been used to provide an envelope for the seed label to protect it from the weather. In U.S. Pat. No. 2,012,990—Choate, granted Sep. 3, 1935, and U.S. Pat. No. 2,333,302—Enk, granted Nov. 2, 1943, a framework supported by one or more metal legs inserted into the ground supports the seed packet, which is covered by a transparent material, such as celluloid. In the Choate device, the celluloid and the label or seed packet are slidably mounted within the framework, while in Enk, the transparent cover slips over the framework and the seed packet. The framework and legs comprise one piece of formed wire in Enk, while in Choate, a sheet metal frame is welded to a metal supporting rod.

More elaborate devices involve a label supporting frame and platform obliquely mounted on a stake. U.S. Pat. No. 863,633—Bateman, granted Oct. 16, 1906, includes an inclined head and stake. A partial frame surrounds the head on the top and two sides. The frame retains an information-bearing card and a transparent protective strip over the card. U.S. Pat. No. 1,966,922—Coleman is for a grave marker. A rectangular base plate is supported on a spike. Mounted on the base plate in ascending order are a waterproof material, an information card, a transparent panel and a rectangular washer, all held in place by a frame fastened to the base plate. Additional examples of inclined label supporting surfaces mounted with respect to a stake are seen in Design Pat. No. D-186,779—Borin. Inclined surfaces direct the label face upwardly and expose it to rain, therefore requiring transparent covering means to insure satisfactory long-term use.

Currently, plants are usually provided by the grower with plastic I.D. tags that usually depict a blooming plant beneath its name, and including growing information and instructions. While providing useful information, these I.D. tags are unsightly and prone to blowing away or easily being dislodged and lost.

U.S. Pat. No. 6,729,059—Overdevest et al shows a plant marker assembly that has a tall stake with a crooked top end that supports a depending rectangular hang tag having a pocket for receiving the pointed end of a commercial plastic plant I.D. that comes with a plant. Design Pat. No. D-170,936—Pegram shows a rectangular compartment suitable for holding a label supported by a downwardly converging leg. A scarecrow configuration extends upwardly from the label supporting compartment.

None of these prior art plant markers blends in with the landscape, nor is versatile to display a variety of plant indicia. Thus, there is a need for a decorative plant identification marker that provides means for storing and displaying a variety of plant indicia that is not easily dislodged, is durable, and blends in with the surrounding landscape.

SUMMARY OF THE INVENTION

It is therefore an object of this invention to provide a decorative plant identification marker, that that provides means for storing and displaying a variety of plant indicia that is not easily dislodged, is durable, and blends in with the surrounding landscape.

The plant identification marker of this invention is particularly well suited for labeling flowerbeds, vegetable plants, and the like. It is designed for use with the flimsy plastic plant I.D.s and sees packets used commercially today. These I.D.s and packets feature a picture of the mature plant, the plant identification (name), and planting and care instructions. The plant I.D.s have a body carrying the above information and a depending short point for insertion in the ground. They are usually so small and flimsy to be practically useless, since they can easily be dislodged and blow away. Seed in a packet do not have any means for ground insertion for identification.

In one aspect this invention features a unitary flat plastic base in the form of a leaf having a pointed stem depending from the leaf body for insertion in the ground. The lower portion of the leaf is covered by a mating front cover that is secured to it on the sides only, thereby creating a confining pocket having upper open slot, and a lower open slot enabling water drainage from the pocket.

The upper slot in the plant marker is wide enough to receive a truncated plastic plant I.D. or a portion of a seed packet for partial storage in the pocket, while allowing a small upper portion bearing plant identification to be displayed. This allows repeated and convenient insertion and removal of a particular plant tag or seed packet to view care and growing instructions and other information. The pocket for receiving the plant ID tag secures it against unintentional removal from the marker and provides protection from the weather. In addition, the pocket is large enough to receive and store other information-containing paper or plastic indicia.

In another aspect, this invention features method of marking the identification of a plant that has a thin plastic marker tag that includes top portion with a picture of the grown plant, a middle portion with plant identification and care information, and lower portion, comprising the steps of providing a plant identification marker having a body with a top opening into a pocket, and a lower pointed stake, cutting the top and lower portions off the plastic marker tag, and inserting the remaining middle portion of the plastic marker tag through the top opening into the pocket so that only the top of the middle portion is exposed.

Other features and objects of this invention will become apparent upon reference to the following description of the accompanying drawings, in which:

BRIEF DESCRIPTION OF THE DRAWINGS

FIG. 1 is an exploded perspective view of a plant identification marker according to this invention, showing the front cover prior to assembly to the marker body;

FIG. 2 is a view similar to FIG. 1, shown after assembly;

FIG. 3 is a front view of the marker of FIG. 1;

DETAILED DESCRIPTION OF THE PREFERRED EMBODIMENTS

Figure 4:
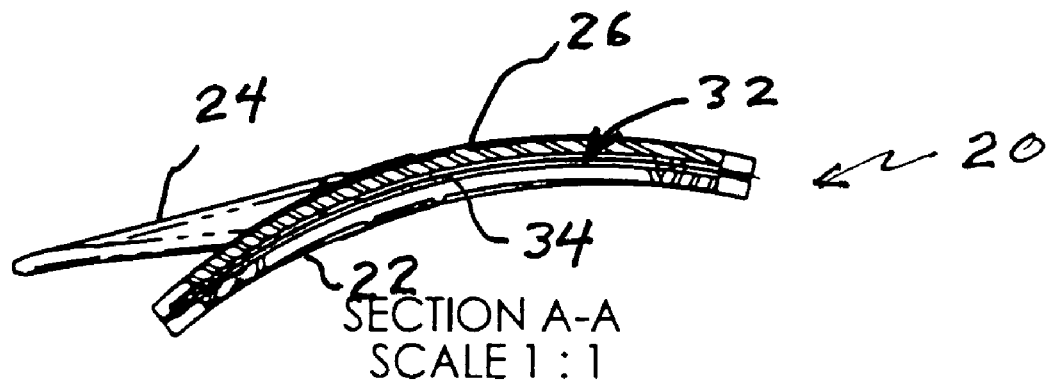
FIG. 4 is a sectional view taken along line A-A of FIG. 3.
Figures 5, 6:
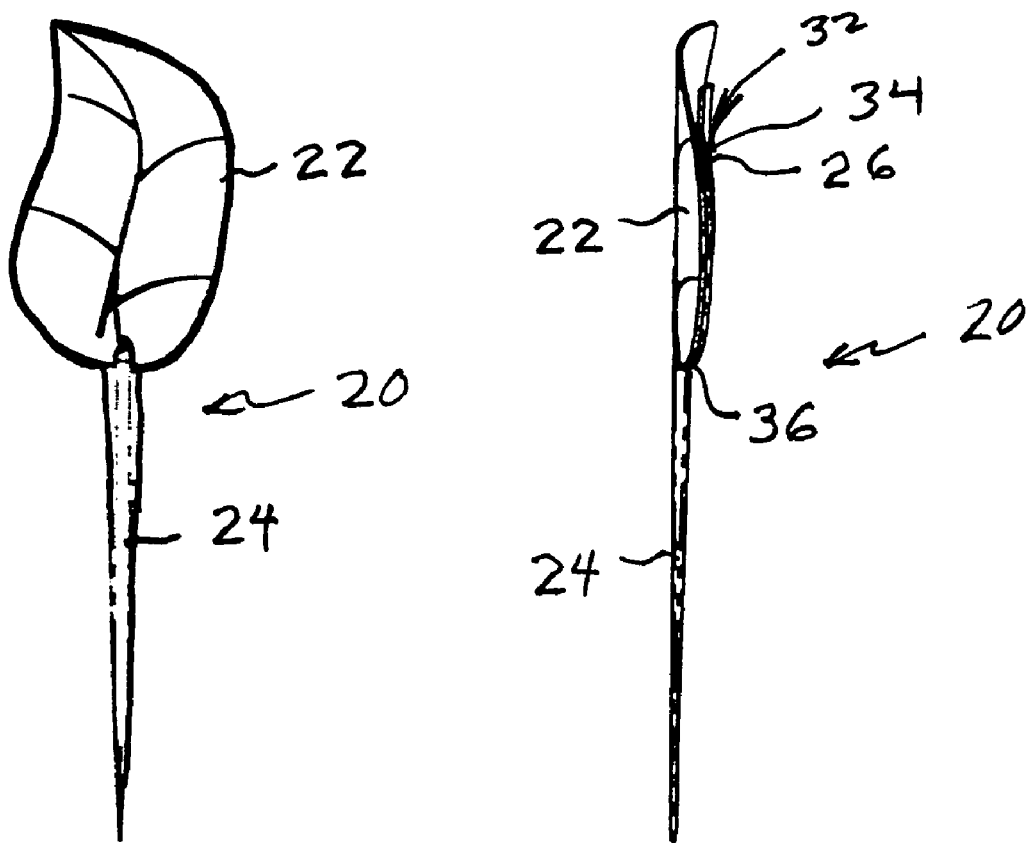
FIG. 5 is a side view of the marker of FIG. 1.
FIG. 6 is a rear view of the marker of FIG. 1.

Referring to FIGS. 1-6, a plant identification marker 20 comprises a PVC or other plastic leaf-shaped body 22 having a depending pointed stem 24 for insertion into the ground. A front flap 26 is integrally formed with body 22 and attached to it by ultrasonic welds 28 and 30. Alternatively, the attachment could be made by epoxy glue or interlocking plastic tabs, or other known chemical and mechanical fasteners. Front flap 16 is molded mate with the outline of body 22 and incorporates raised veins so as to resemble a leaf. Thus, plant identification marker 20 is preferably made of a green color to blend in with the leaves of growing plants.

As shown in FIGS. 3 and 4, when the front flap 26 is attached to body 22, it creates a pocket 32 having a wide top opening 34 and a bottom opening 36. Top opening 34 is sized to receive a portion of a plastic plant tag or a seed packet, leaving a portion exposed for plant identification, as later described. Lower opening 36 is provided for drainage of rain or irrigation water that would otherwise accumulate in pocket 32.

Figure 7:
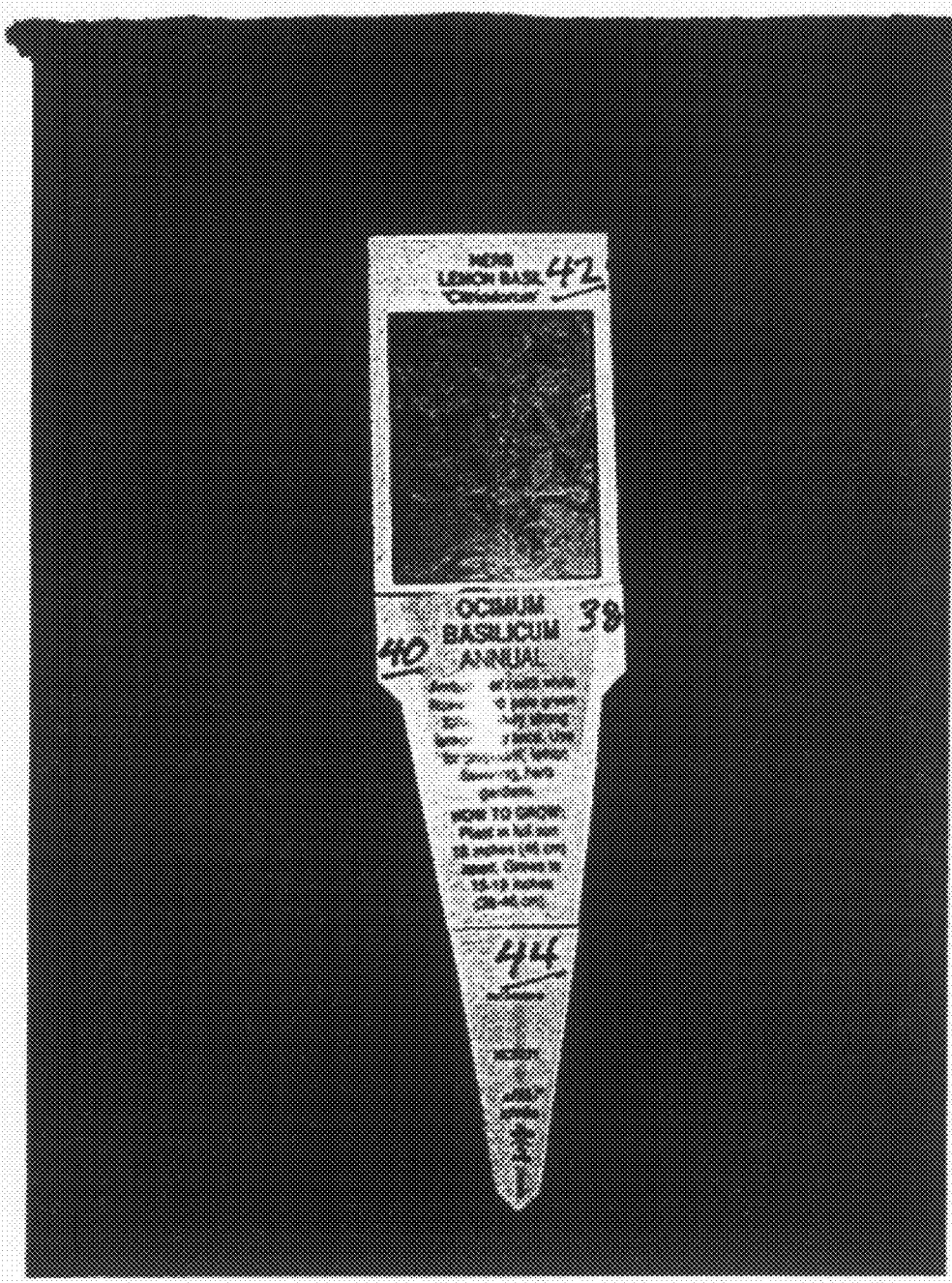
FIG. 7 is a front view of a plant identification tag for use in the invention.
Figure 8:
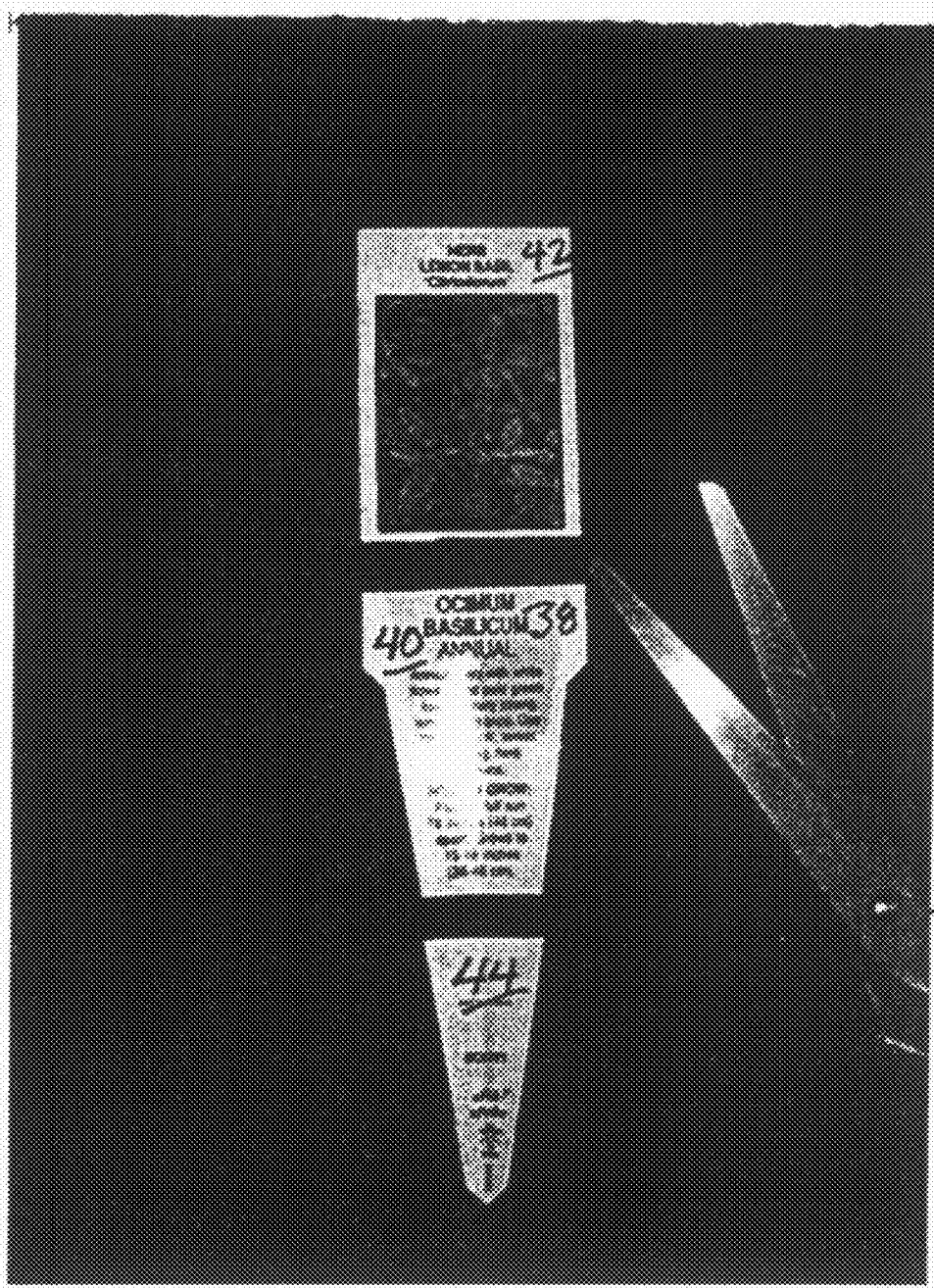
FIG. 8 is view similar to FIG. 7, but showing removal of unneeded portions of the plant tag, leaving plant identification and growing and care instructions.
Figure 9:
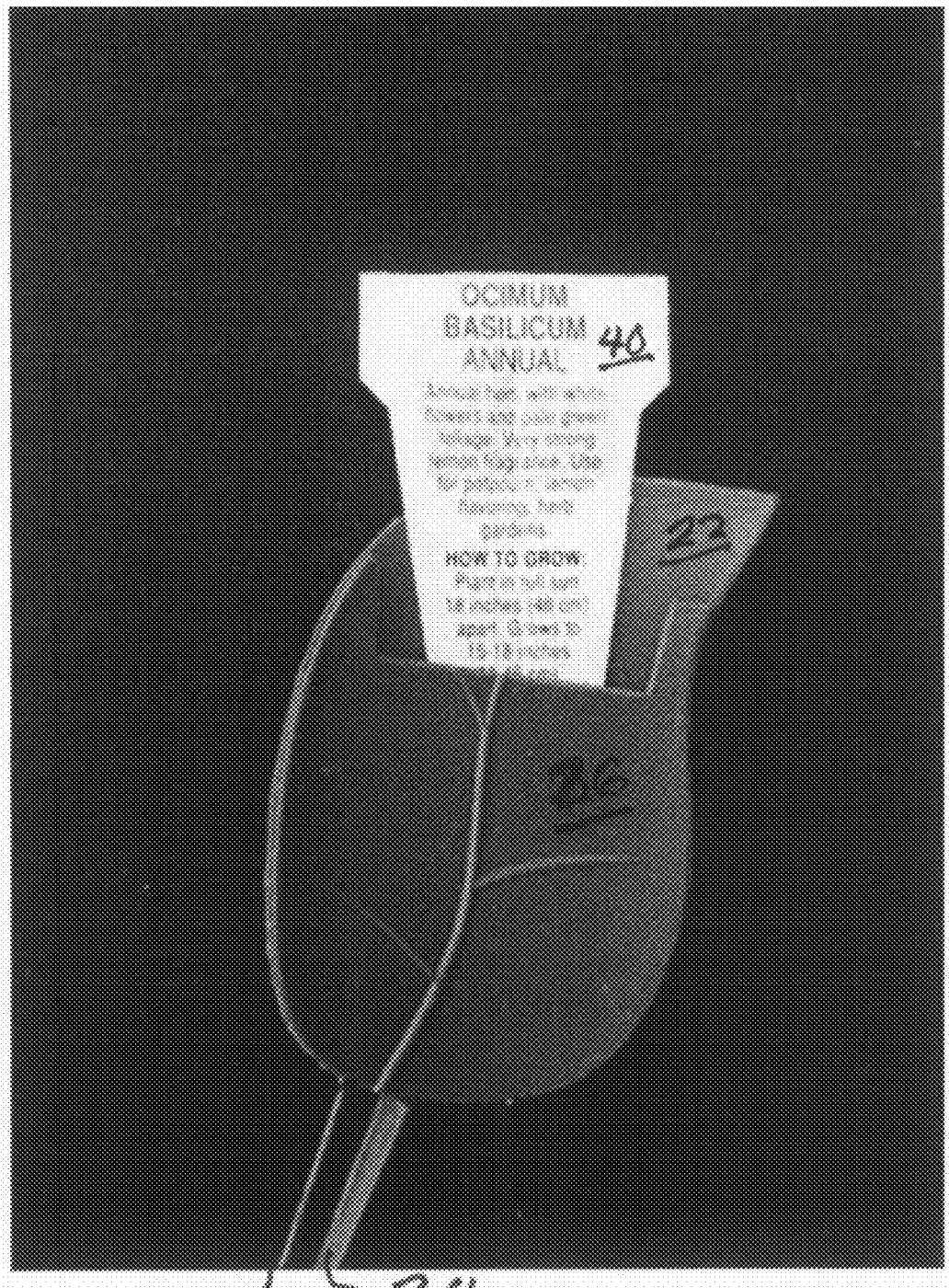
FIG. 9 is a front view of the tag of FIGS. 7 and 8 being inserted into the pocket of the plant marker of FIGS. 1-6.
Figure 10:
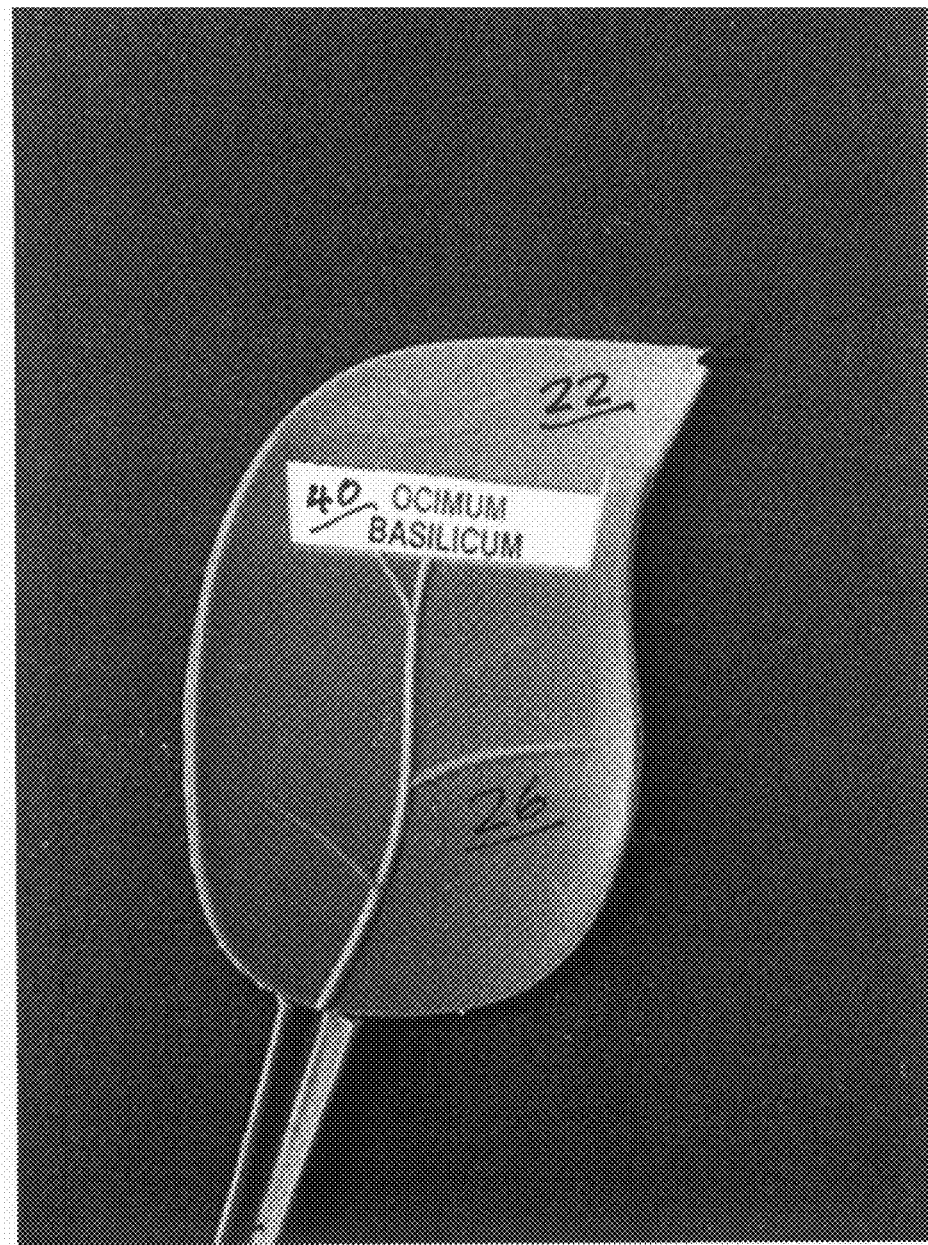
FIG. 10 is a view similar to FIG. 9, showing the tag fully inserted.

As shown in FIG. 7, a plant tag 38 is usually supplied with growing plants purchased at a garden store. These tags each usually include a main portion 40, containing the plant's botanical name and planting and care instructions, a top portion 42, containing a picture of the plant when grown and its common name, and a bottom stake portion 44 for ground insertion. To prepare this tag 38 for use with the plant identification marker 20 of this invention, scissors 46 are used to cut off the top 42 and bottom 44 portions of tag 38, leaving main portion 40 with the plant's botanical name at the top, as illustrated in FIG. 8. FIG. 9 shows tag main body 40 being inserted through top opening 34 into pocket 32 of marker 20. FIG. 10 shows tag main portion 40 fully inserted, with marker 20 ready for ground insertion of stake portion 44 by a gardener.

Figure 11:
FIG. 11 is a view of the marker of FIG. 10 planted in the ground among plants being identified.

In FIG. 11, plant identification marker 20 is shown inserted in the ground among the plants being identified, here *ocium basilicum*, or lemon basil. If the gardener wants to check on care instructions, she merely slips tag main portion 40 out of pocket 32, reads, then slips the tag portion 40 back through the opening 34 into pocket 32. As illustrated, only the botanical name shows, which, along with the green color and leaf shape, marker 20 is pretty well camouflaged, yet the plant name is visible to anyone touring the garden.

Figure 12:
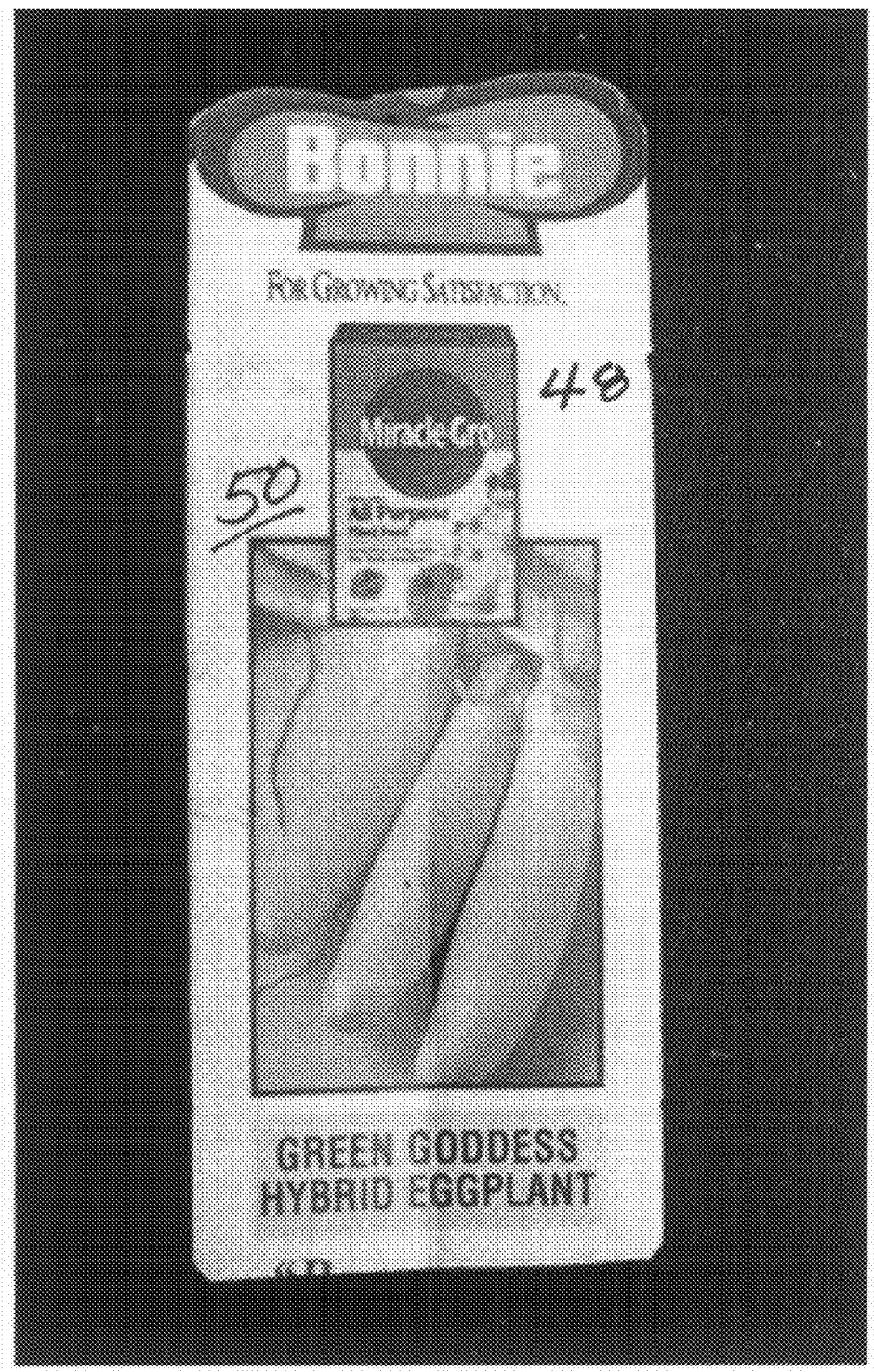
FIG. 12 is a front view of a seed packet.
Figure 13:
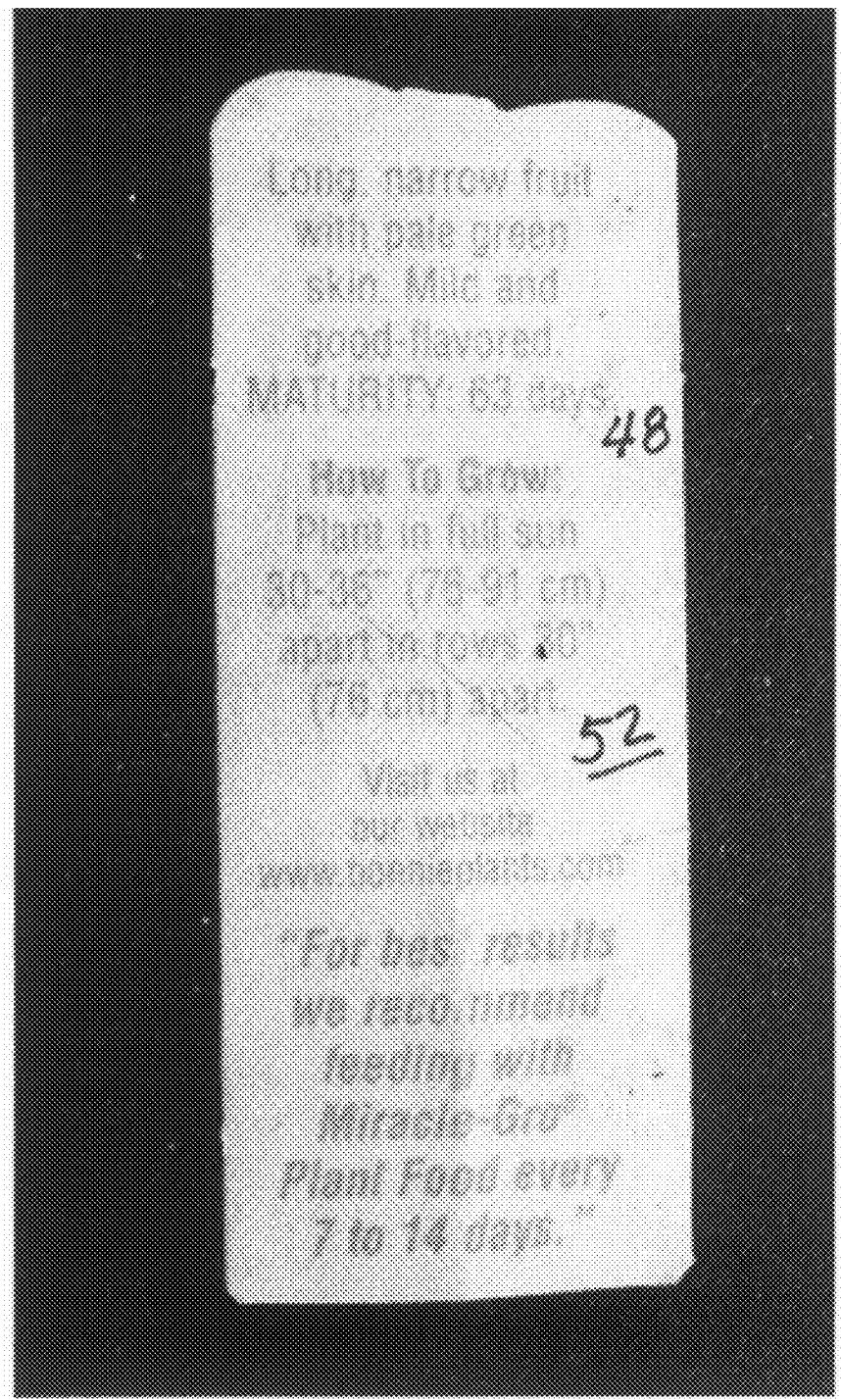
FIG. 13 is a rear view of the seed packet of FIG. 12, showing planting and care instructions.
Figure 14:
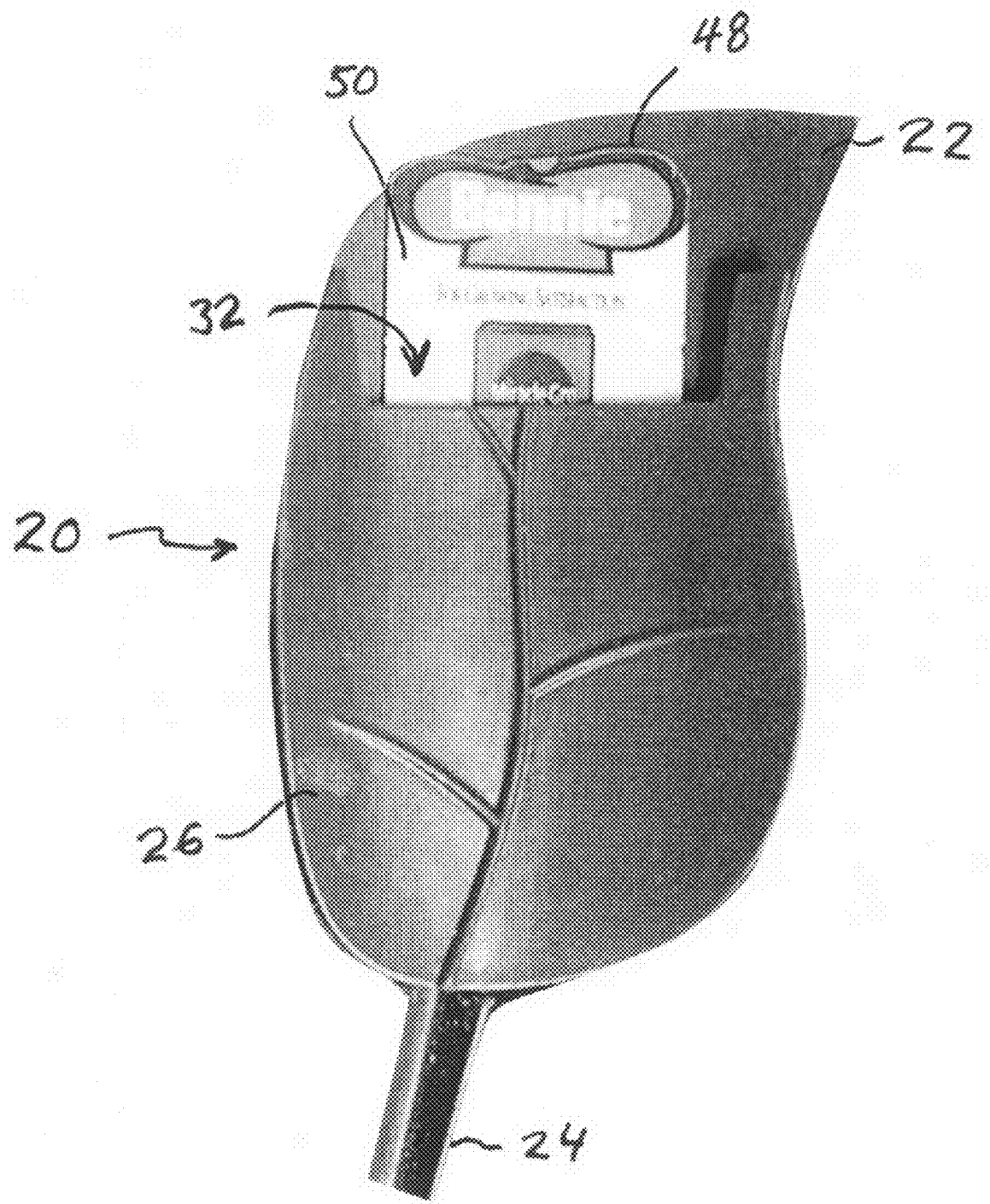
FIG. 14 is a front view of the seed packet of FIGS. 12 and 13 inserted into the pocket of the marker of this invention.
Figure 15:
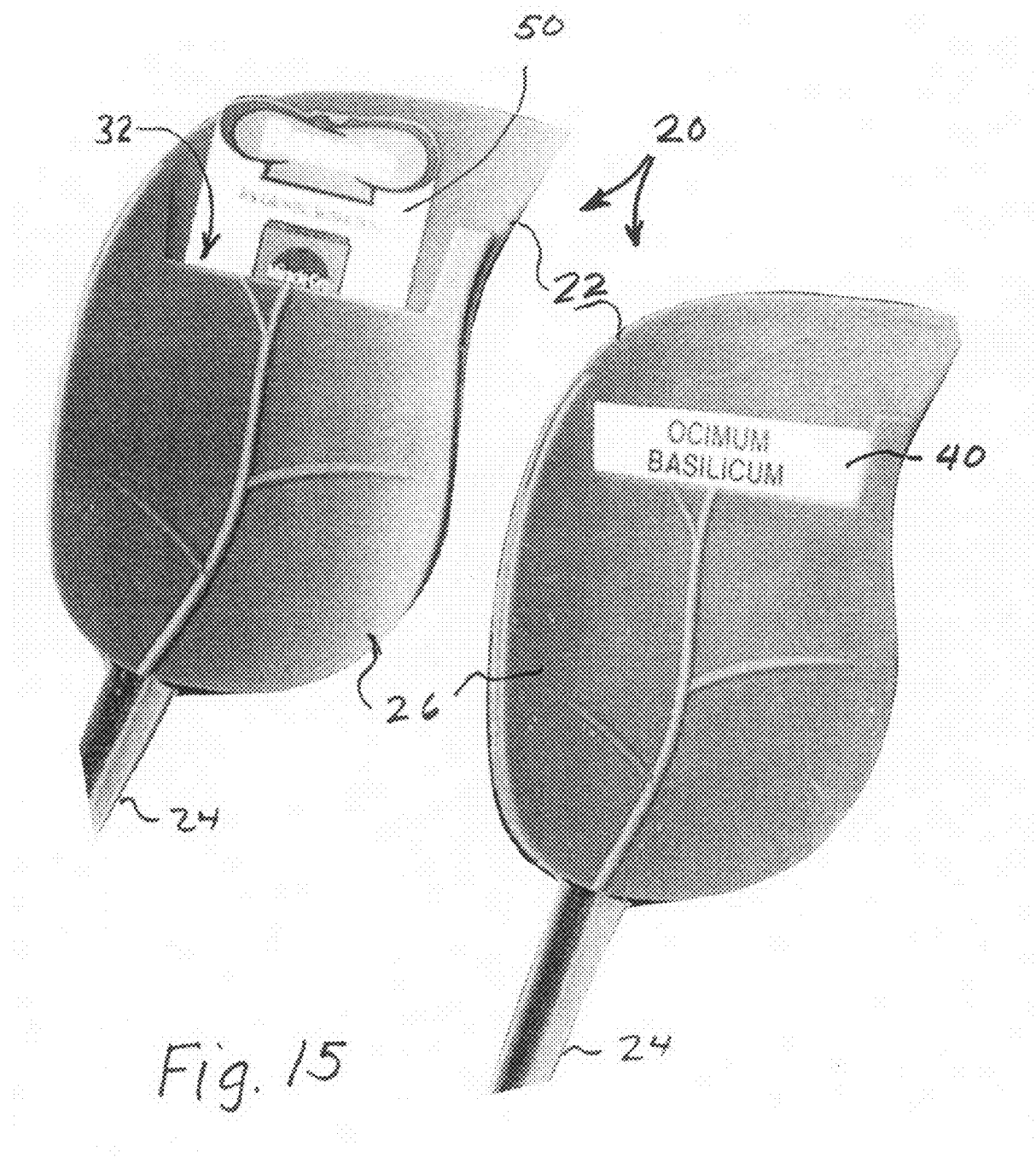
FIG. 15 is a front view combining FIGS. 10 and 14 for comparison.

FIGS. 12 and 13 illustrate a seed packet 48 having a front side 50 containing the plant name, a hybrid eggplant, and a picture of the grown vegetable. The back 52 of packet 48 includes a description of the grown vegetable, and planting and care instructions. Seed packet 48 is typical of most seed packets. FIG. 14 shows seed packet inserted through top opening 34 and into pocket 32, with only a portion of the packet showing. FIG. 15 illustrates two markers 20, one carrying a portion of tag 38, and the other carrying seed packet 48.

By providing a wide top opening, marker 20 is able to receive the wide main tag portion 40 and the seed packet 48. Pocket 32 is sized to confine most of the tag and packet against accidental removal by wind or otherwise, and hide it from view, while leaving a sufficient portion to enable plant identification. Bottom opening 26 enables the drainage of any water entering pocket 32 to prevent erosion of the printing on the tag portion 30 and packet portion 48.

While only preferred embodiments of this invention have been shown and described, obvious modifications may be made without departing from the scope if this invention, such as changing material, color and shape.

We claim:

1. A method of marking the identification of a plant that has a thin plastic marker tag that includes top portion with a picture of the grown plant, a middle portion with plant identification and care information, and lower portion, comprising the steps of providing a plant identification marker having a body with a top opening into a pocket, and a lower pointed stake, cutting the top and lower portions off the plastic marker tag, and inserting the remaining middle portion of the plastic marker tag through the top opening into the pocket so that only a top of a middle portion is exposed, wherein the top of the middle portion includes the plant identification.

* * * * *